(12) United States Patent
Brenner et al.

(10) Patent No.: US 10,938,676 B2
(45) Date of Patent: Mar. 2, 2021

(54) CLOUD LAUNCH WIZARD (71) Applicant: EMC IP Holding Company LLC, Hopkinton, MA (US)

(72) Inventors: Adam E. Brenner, Mission Viejo, CA (US); Mark D. Malamut, Aliso Viejo, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 140 days.

(21) Appl. No.: 16/172,290

(22) Filed: Oct. 26, 2018

(65) Prior Publication Data
US 2020/0136931 A1 Apr. 30, 2020

(51) Int. Cl.
| | |
|---|---|
| *G06F 15/177* | (2006.01) |
| *H04L 12/24* | (2006.01) |
| *H04L 29/08* | (2006.01) |
| *G06F 8/60* | (2018.01) |
| *G06F 8/30* | (2018.01) |
| *G06F 21/62* | (2013.01) |
| *G06F 9/50* | (2006.01) |

(52) U.S. Cl.
CPC ............ *H04L 41/5054* (2013.01); *G06F 8/30* (2013.01); *G06F 8/60* (2013.01); *G06F 9/5077* (2013.01); *G06F 21/62* (2013.01); *H04L 41/0873* (2013.01); *H04L 41/0886* (2013.01); *H04L 41/5051* (2013.01); *H04L 67/34* (2013.01); *H04L 67/10* (2013.01)

(58) Field of Classification Search
CPC ..... H04L 67/28; H04L 43/0876; H04L 67/10; G06F 16/22
USPC ....................................................... 709/220
See application file for complete search history.

(56) References Cited

U.S. PATENT DOCUMENTS

2014/0372533 A1* 12/2014 Fu .......................... G06F 9/5072
709/204
2018/0196832 A1* 7/2018 Maybee ................. G06F 12/123

* cited by examiner

*Primary Examiner* — Wing F Chan
*Assistant Examiner* — Andrew Woo
(74) *Attorney, Agent, or Firm* — Workman Nydegger (57) ABSTRACT

One example method includes receiving an input that indicates selection of a cloud storage provider, receiving one or more product selection inputs, each of the product selection inputs indicating selection of a respective data protection product, receiving an input indicating an instance size, assembling the inputs together to define a data protection configuration, and automatically generating a script which, when executed by one or more hardware processors, deploys the data protection configuration in a cloud storage environment of the selected cloud storage provider.

20 Claims, 6 Drawing Sheets

CLOUD LAUNCH WIZARD

FIELD OF THE INVENTION

Embodiments of the present invention generally relate to data protection and availability. More particularly, at least some embodiments of the invention relate to systems, hardware, software, computer-readable media, and methods for rapid and efficient deployment of disparate data protection products in public and private data protection environments.

BACKGROUND

Enterprises generate significant amounts of important data that is typically preserved in some type of data protection environment. Typical data protection environments employ a variety of hardware and software in order to provide data security, access, and availability. Oftentimes however, the data protection needs of an enterprise can only be met through the use of a combination of different products. This may be the case in on-premises/private, public, and hybrid, cloud data protection environments, as well as in public cloud data protection environments.

To illustrate with an example involving multiple different products, a user such as an administrator must deploy infrastructures, whether hardware and/or software, for each different product. Thus, in a private cloud setting, the user may be required to download an Open Virtualization Appliance (OVA) file, containing a compressed, installable version of a virtual machine (VM), and install the OVA in the virtual environment. As well, the user must provision the VM, such as by adding elements such as a CPU, memory, disks, network, and other elements needed to enable the VM to operate.

A similar approach must be employed in public cloud environments. For example, the user may have to use marketplace offerings, if available, along with further modifications to add the necessary data disks. If no marketplace offering exists for the needed functionality, customers of the public cloud may have to deploy a generic Linux VM, for example, and then manually install the RPM Packet Manager (RPM)/Microsoft Installer (MSI) packages pertaining to the VM.

A further complication in both public and private cloud environments is that processes such as those just noted must be performed for every installation of a product. As well, those processes must be performed again for every subsequent deployment. Further, such deployments may require a high level of knowledge and skill on the part of the user, and if deployments are attempted by a user who lacks the requisite knowledge and skill, problems may occur with the deployment. A related concern is that the documentation, which may be substantial, needed to support the deployment may not be clean. Thus, errors or omissions in the documentation may further complicate deployments.

As the foregoing examples illustrate, it may be cumbersome and time consuming for a user to attempt to deploy all the products needed for a data protection environment. To further illustrate this point, in the public cloud environment, it is often the case that only one product can be deployed at a time. As well, it sometimes occurs that product deployments are incomplete. Further, the deployment options presented to the user may not all be valid for the environment and/or combination of products that the user is interested in.

Finally, some product deployments require a configuration with licensing, and yet other products may require multiple steps and inputs.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection and availability. More particularly, at least some embodiments of the invention relate to systems, hardware, software, computer-readable media, and methods for rapid and efficient deployment of disparate data protection products in public and private data protection environments, as well as in hybrid cloud arrangements.

In general, example embodiments of the invention embrace a Cloud Launch Wizard (CLW) which, among other things, simplifies aspects of data protection product deployments in both public cloud environments, private cloud environments, and hybrid cloud environments. In at least some embodiments, a user may initiate such deployments by way of a web based graphical user interface (GUI), such as a web browser for example, that presents selection options to the user in a 'wizard' format. Upon completion of the process, the customer will have a fully configured environment that requires minimal user intervention or interaction. In some example embodiments, a fully configured and functional data protection environment can be deployed in a cloud computing environment in as few as three steps by the user, and in significantly less time than would be required to deploy a comparable data protection environment using a conventional approach.

Using the user interface, the user may access a CLW website and then specify their cloud provider from a list of options presented by the wizard. The cloud provider may be public, private, or hybrid. Examples of public cloud providers include Amazon AWS, Microsoft Azure, and the Google platform. Example private clouds include, but are not limited to, on-prem VMware, Hyper-V, KVM, and OpenStack.

After the user has specified the cloud environment where the data protection products are to be deployed, the user is then presented with various choices regarding the data protection products that the user would like to deploy in the selected environment. Such data protection products may, for example, comprise Dell EMC products such as Avamar, Networker, and DataDomain. However, the scope of the invention is not limited to these example data protection products. The UI may be backed by programming that guides the user. For example, the UI may not permit a user to select incompatible products. As well, the UI may be dynamically updated to show available products and versions. At this stage, or another stage, the user can also specify, again by way of the UI, the size of the instance needed, that is, the amount of storage required by the user. The user can then 'save' the specified configuration.

At the final stage, the UI presents the user with the 'deploy' option. When the user elects to deploy the configuration that has been defined, a configuration-specific script is generated. The user can then download the script, save the script locally and/or elsewhere, and provide the script to the selected cloud environment. Because the user has specified, at an earlier stage, a particular cloud environment, the script is generated based on that selection and, as such, the script is fully compatible with, and understandable by, the cloud provider.

The script can then be run in the cloud environment, specifically, a cloud management console of the cloud environment, to configure, provision, and deploy the configuration defined by the user. In the example case of Amazon AWS, the user can use the AWS console to ask for the script to be run. The cloud management console may be referred to herein simply as a console.

Advantageously then, embodiments of the invention may provide various benefits and improvements relative to conventional hardware, systems and methods. To illustrate, embodiments of the invention may improve the operation of a computing system, or element of a computing system, by enabling the automatic provisioning of a customized data protection configuration defined by a user. As another example, embodiments of the invention may improve the operation of a computing system by implementing integration of various different data protection products, and also by ensuring compatibility and interoperability of the data protection products in a user defined configuration. Further, embodiments of the invention may improve the speed with which a data protection configuration is deployed in public, private, and hybrid, cloud computing environments. Various other advantages of example embodiments of the invention are disclosed elsewhere herein.

A. Aspects of an Example Operating Environment

The following is a discussion of aspects of example operating environments for various embodiments of the invention. This discussion is not intended to limit the scope of the invention, or the applicability of the embodiments, in any way.

Where data protection operations, such as backup and/or restore operations are performed, at least some embodiments may be employed in connection with a data protection environment, which can implement backup, archive, restore, and/or disaster recovery, functions. However, the scope of the invention is not limited to this example data protection environment and extends, more generally, to any cloud computing environment, and is not limited to implementation of any particular functionality in a cloud computing environment. More generally still, the scope of the invention embraces any operating environment in which the disclosed concepts may be useful. For example, embodiments of the invention may be employed in connection with data backup and restore platforms such as the Dell-EMC NetWorker and Avamar platforms, and with data storage environments such as the Dell EMC DataDomain.

The data protection environment may take the form of a public or private cloud storage environment, an on-premises storage environment, and hybrid cloud storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
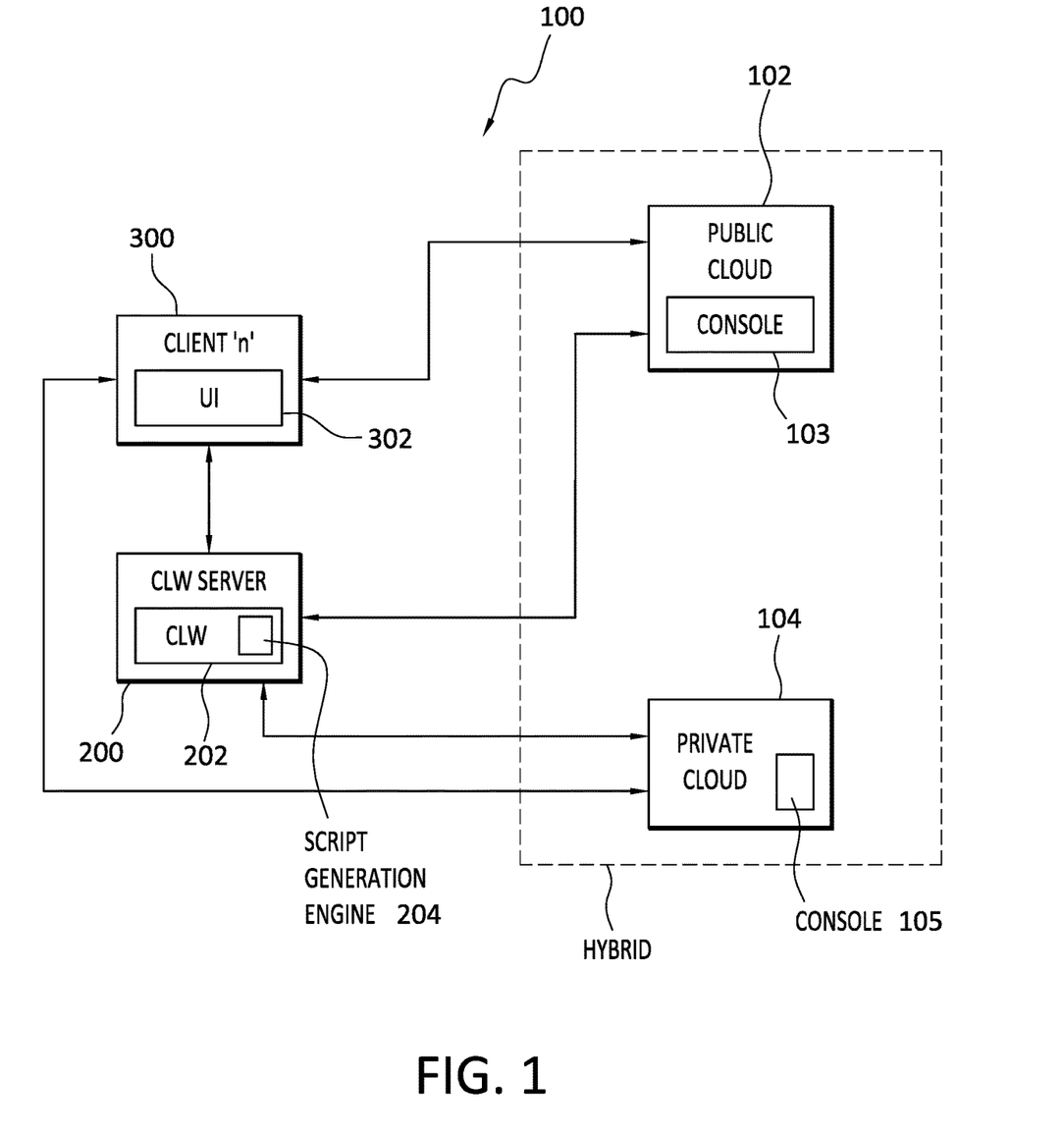
FIG. 1 discloses aspects of an example operating environment for some embodiments of the invention.

With particular attention now to FIG. 1, an operating environment 100 may include a data protection environment which can comprise, or consist of, a public cloud datacenter 102 and/or a private cloud datacenter 104. As indicated by the broken lines in FIG. 1, yet other example operation environments are directed to a hybrid cloud arrangement that includes both public and private cloud elements. Examples of a public cloud datacenter 102 include, but are not limited to, Microsoft Azure blob storage, Amazon AWS, Dell EMC ECS, or any other cloud storage environment. The private cloud datacenter 104 may take the form of, or include, an on-prem/private cloud, examples of which include VMware, Hyper-V, KVM, and OpenStack. The scope of the invention is not limited to any particular implementation of a public cloud datacenter 102, or private cloud datacenter 104.

The example operating environment also includes a Cloud Launch Wizard (CLW) server 200 configured to communicate with the public cloud data datacenter 102 and private cloud datacenter 104. In at least some embodiments, the CLW server 200 may reside on-premises at an enterprise, although that is not required. In still other embodiments, the CLW server 200 may reside at a cloud datacenter, such as the public cloud data datacenter 102 or private cloud datacenter 104, for example. More generally, the CLW server 200 need not reside in any particular location, or at any particular site.

Among other things, the CLW server 200 may include a CLW application 202, which may be a web application, configured to perform any, and all, of the CLW functions, processes, and methods disclosed herein. For example, the CLW application 202 may comprise a script generation engine 204 that is operable to generate a script based on user input, and executable in a cloud storage environment. In some embodiments, performance of the CLW functions, processes, and methods, may be distributed among multiple different entities, rather than being performed by way of a single entity such as the CLW server 200. Thus, the functional allocations disclosed herein are provided only by way of example and are not intended to limit the scope of the invention in any way. The CLW server 200, CLW application 202, and CLW UIs presented to a user may collectively comprise a CLW system.

The CLW server 200 and associated functionality and website may be controlled, hosted, and run, by a service provider, such as Dell EMC for example, although that is not required. In this way, the service provider, by way of its website for example, may assist a user in building a data protection configuration that includes products and functionality provided by the service provider.

With continued reference to FIG. 1, one or more clients 300 may access the functionality of the CLW application 202, such as by way of a user interface 302. The user interface 202 may take the form of a graphical user interface (GUI) that is operable to display a web browser to a user. As well, the client(s) 300 may communicate directly with entities such as the public cloud datacenter 102 and/or private cloud datacenter 104. As well, the client 300 may take the form of any system or device that includes a web browser. Such devices may include, for example, desktop computers, laptops, personal digital assistants, tablets, and smartphones.

In brief, and as disclosed in more detail elsewhere herein, a user may access the CLW server 200 by way of the user interface 302 at the client 300, and then use a web browser to define and implement a data protection configuration in a cloud computing environment such as the public cloud datacenter 102 and/or the private cloud datacenter 104. More particularly, the user may generate a script that can then be run in a cloud computing environment, such as by way of a console 103 in the public cloud datacenter 102, and/or by way of a console 105 in the private cloud datacenter 104.

B. Example Host and Server Configurations

Figure 2:
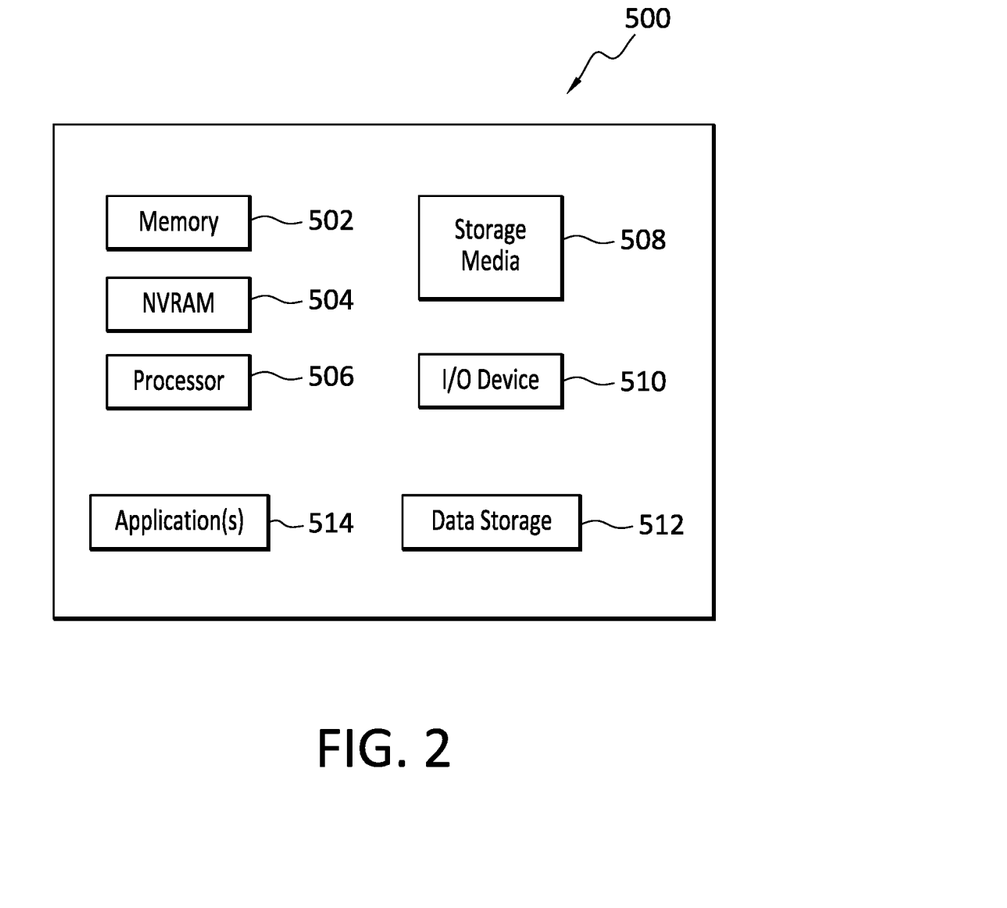
FIG. 2 discloses aspects of an example host configuration.

With reference briefly now to FIG. 2, any one or more of the public cloud datacenter 102, private cloud datacenter 104, console 103, console 105, CLW server 200, CLW application 202, client 300, and UI 302 can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any method or portion thereof disclosed herein, and/or executable by/at any of a storage site, whether on-premised at an enterprise, or a cloud storage site, client, datacenter, or backup server to perform functions disclosed herein in connection with embodiments of the CLW application 202. As well, such instructions may be executable to perform any of the other operations disclosed herein including, but not limited to, read, write, backup, and restore, operations and/or any other data protection operation.

C. Example Data Protection Configuration Workflow

Figure 3A:
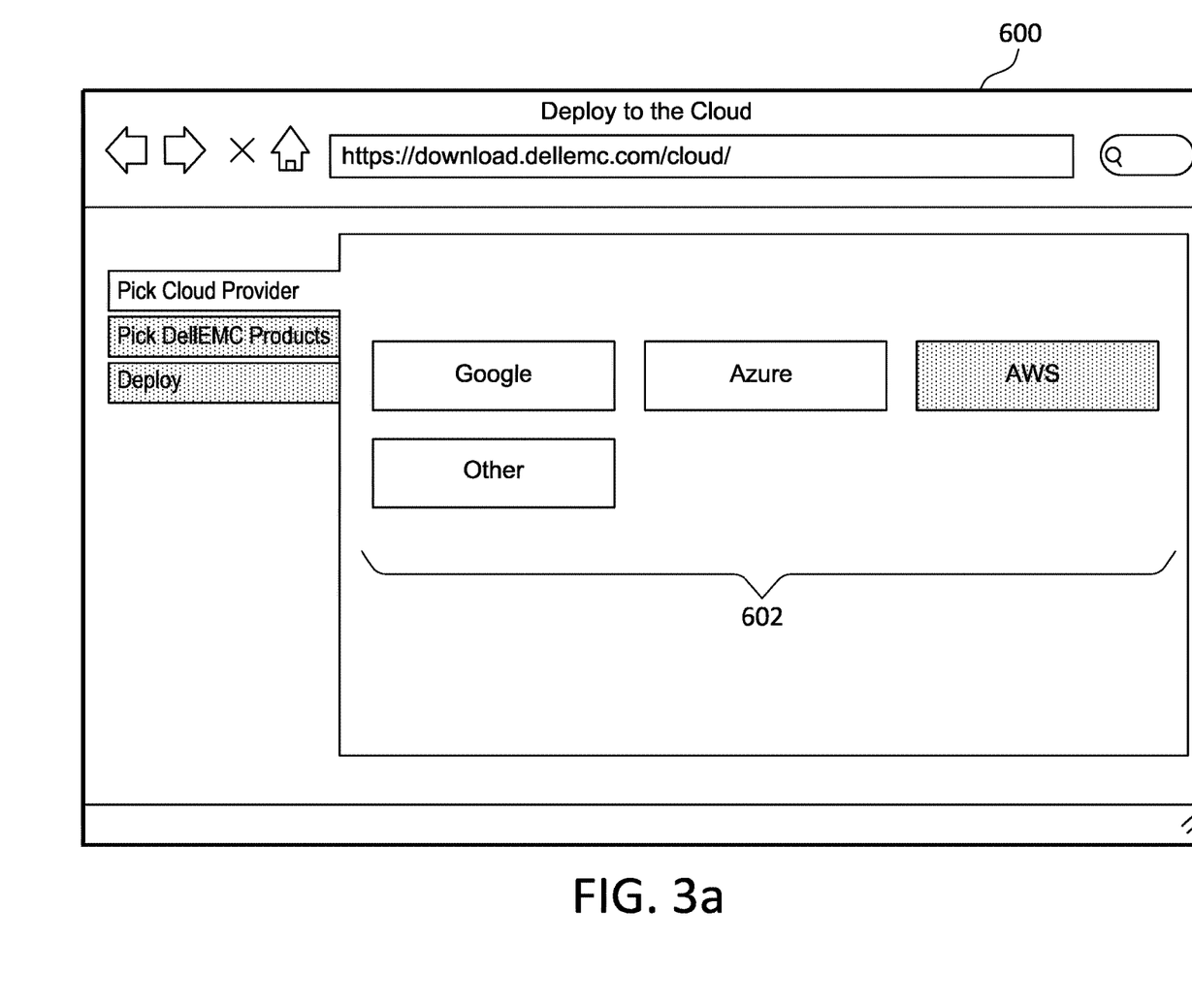
FIGS. 3a, 3b and 3c are example UIs according to various embodiments.
Figure 3B:
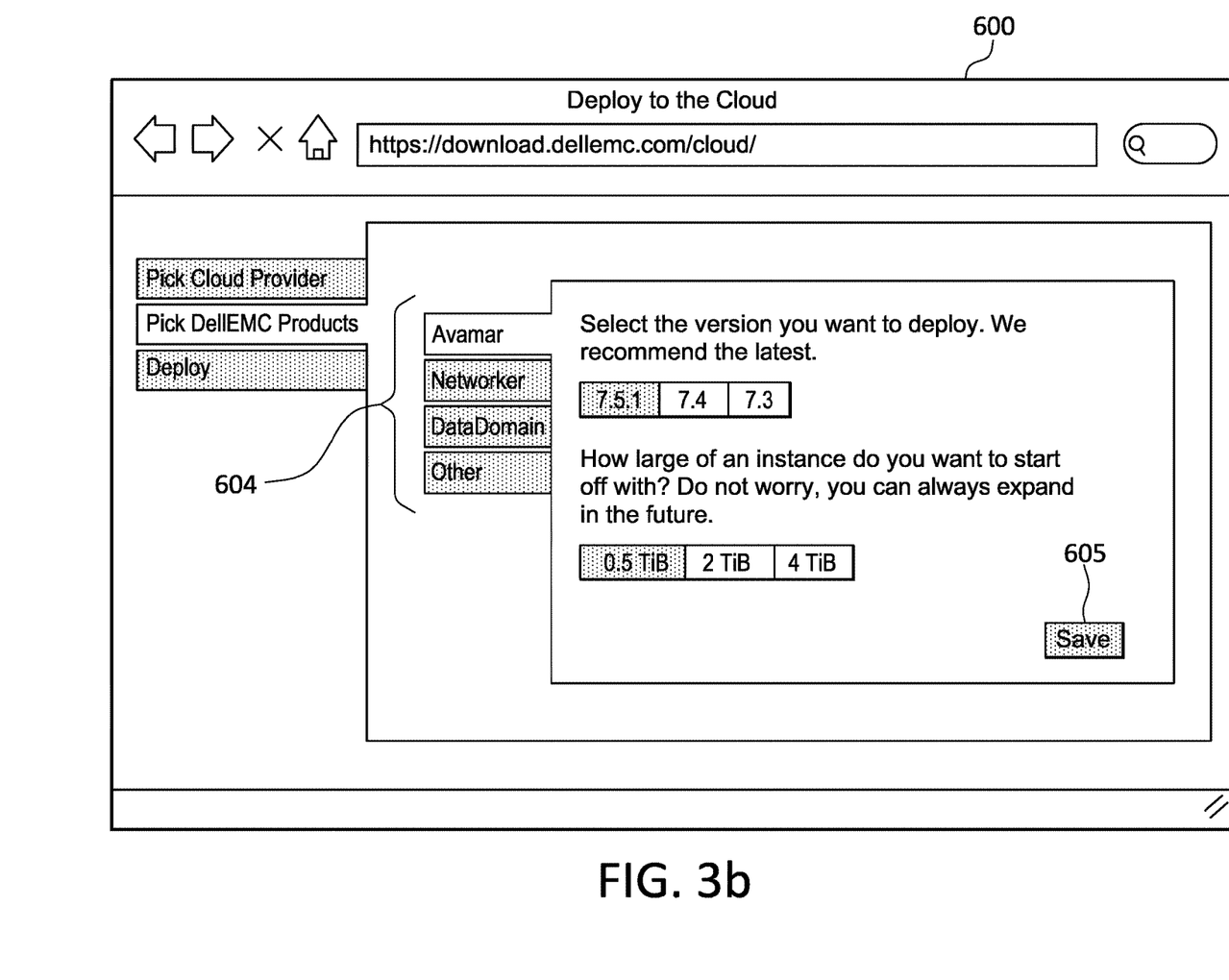
Figure 3C:
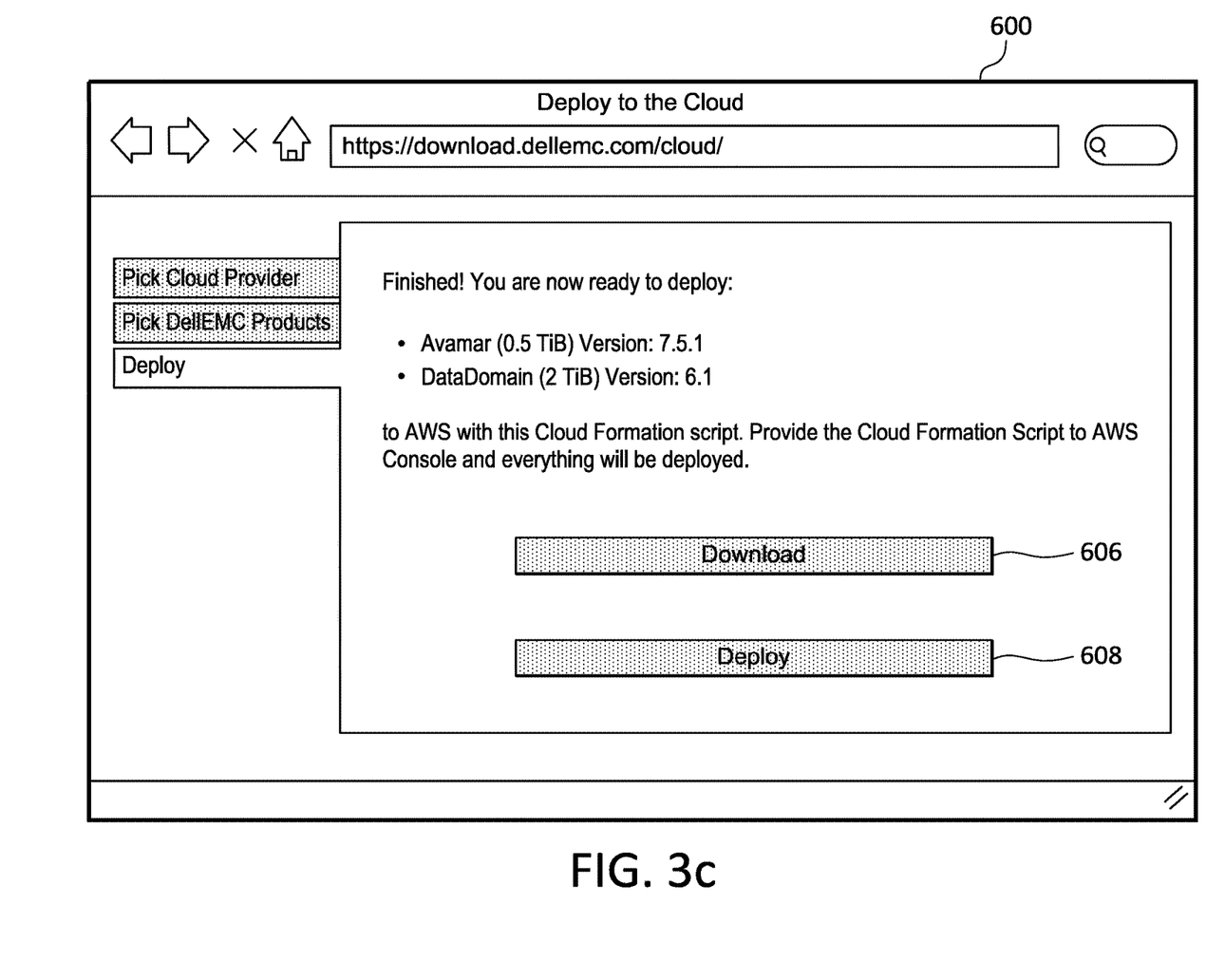

Turning now to FIGS. 3*a*, 3*b* and 3*c*, details are provided concerning aspects of an example workflow for defining and implementing a data protection configuration in a cloud computing environment. In general, the workflow will be addressed by way of example interfaces that may be presented to a user, such as by way of a web browser, that enable the user to define and implement a custom data protection configuration. The user can access the web browser by way of a suitable user interface 600, such as a GUI for example. As shown by the arrows at the top of the displays in FIGS. 3*a*-3*c*, the user may return to a prior screen, or move ahead to the next screen, at any time. This functionality may be useful if a user has a need to return to a prior screen to change the input that was provided by way of that screen.

With particular reference first to FIG. 3*a*, a user can access a CLW server, and associated CLW application, by entering an address in the web browser, and optionally providing credentials such as username/password, when so prompted. When the user has successfully accessed the CLW system, the UI may first present the user with an option to 'Pick Cloud Provider.' In the illustrated example, where the CLW website is hosted by Dell EMC, the user is presented with various user-selectable icons 602 which, when selected by the user, trigger an input to the CLW system indicating which cloud provider that is, cloud datacenter where the user data protection configuration will be deployed, has been selected by the user. The user-selectable icons, or menu options, in the example of FIG. 3*a* include Google, Azure, Amazon AWS, and Other.

After the user has selected the cloud provider in which the data protection configuration is to be deployed, the user may then be presented with another screen, an example of which is disclosed in FIG. 3*b*. As shown in FIG. 3*b*, the user may be presented with various user-selectable icons 604 which, when selected by the user, trigger an input to the CLW system indicating which data protection product(s), of the service provider, the user would like to deploy in the cloud storage environment. In the illustrated example, the data protection products are Dell EMC data protection products, although that is not required and the scope of the invention is not limited to any type, number, or mix, of data protection products. The particular data protection products in FIG. 3a that may be selected by a user include Avamar, NetWorker, DataDomain, and Other. Other example data protection products that may be presented to a user for selection include, but are not limited to, the Dell EMC products CloudBoost, eCDM, DP Search, and DP Advisor, for example. The user can select any number of data protection products, and as few as one data protection product.

The user may select, or attempt to select, any/all of these, along with corresponding versions of each. The CLW system will dynamically update the displayed page to show available versions and product sizes, where the products/versions that are displayed are listed based on what the previous data protection product selections were. If two or more products are not compatible with each other, the CLW system will prevent the user from adding them to the data protection configuration. For example, if a user selects product A, and products B and C are compatible with A, but product D is not, only products B and C will be displayed after the user selects product A. Product D would not be displayed because it is not compatible with selected product A.

In some embodiments, if the user attempts to select a product that is not compatible with one or more other products already selected, the user may receive a warning and/or be presented with the option to select from a list (not shown) of compatible products having functionality comparable to that of the product that the user unsuccessfully attempted to select. In this way, the user has assurance that the products ultimately selected to define the data protection configuration are all compatible with each other and, as such, errors that may otherwise arise from the use of incompatible products can be eliminated. Thus, even a user with minimal experience and background may be able to quickly and easily assemble a data protection configuration that has minimal potential for problems.

As further indicated in FIG. 3b, the user may be presented with the option to select the size of the instance that the user wants to implement in the cloud storage environment. In the illustrated example, the user can choose 0.5 Tb, 2 Tb, or 4 Tb as the desired amount of storage space.

When the user has selected the data protection products, and specified an instance size, the user can then 'SAVE' 605 the data protection configuration that has thus been defined. While not specifically indicated in FIG. 3b, the use may have the option to name the configuration prior to saving.

With respect to the aforementioned 'SAVE' functionality, the CLW system may save a copy of each data protection configuration that is generated. The saved data protection configurations may be used for a variety of purposes, such as performance of analytics. To illustrate, the save configurations may be evaluated, by a user, administrator, or other party, to determine how many times a product "X" was used. As another example, the configurations may be evaluated to determine how many times product "X" was used together with product "Z." In a further example, the configurations may be evaluated to determine which version(s) of product "X" are most popular. As well, the configurations may be evaluated to determine, for example, what size is most popular. More generally, any information relating to any one or more of the saved data protection information configurations can be analyzed for any of a variety of purposes. To illustrate, information obtained from analysis of the data protection configurations may be used, for example, by the service provider to better understand the needs of its customers, and to implement changes to the products and services offered by the service provider to its customers.

After the user has saved the data protection configuration that has been defined, and with reference next to FIG. 3c, the CLW system may then, based on the inputs the customer has provided, such as cloud and products for example, generate a specific and unique executable script that, when run at the cloud datacenter, automates some or all aspects of deploying and configuring the data protection products specified in the data protection configuration that has been defined by the user. In some embodiments, the script is generated automatically in response to a particular event or input, such as the user selecting 'SAVE.' In other embodiments, the script may be generated on-demand, at any time, by the user.

Depending upon the embodiment, the script may be of various types. For public clouds, the script may be a provider-specific deployment script, such as CFScript, or an ARM script. For a private/on-prem cloud, the script may be a VMware vRealize library, or puppet/chef/ansible/salt stack plugin. More generally however, the scope of the invention is not limited to any particular type of script.

As shown in FIG. 3c, the CLW system may display a summary of the data protection configuration that has been defined by the user. The summary may include, for example, a listing of the data protection products and their respective version numbers. The summary may also indicate the cloud platform that has been selected, such as Amazon AWS in the illustrated example.

As well, the CLW system may present the user with a user-selectable icon 606 which, when selected by the user, enables the user to download the script. Use of the script may provide various benefits and advantages. For example, the user, or customer, can use the script as is. That is, the user may provide the script to the cloud provider, such as by way of a console, and everything else is hands off such that the user need take no further action to deploy and provision the data protection configuration. This greatly simplifies the deployment process. Another useful aspect of the use of a script is that the customer, or user, can re-deploy the same product(s) to generate multiple cloud instances. That is, the same data protection configuration may be created multiple times using the same script. As well, the customer can include the script in their existing automation workflow, or modify the script to fit their specific needs.

As further indicated in FIG. 3c, the user may also be presented with the option to deploy 608 the script directly to the selected cloud provider from the UI 600 within CLW. Thus, the user can download 606 and/or deploy 608 the script directly from the UI 600.

D. Further Aspects of Some Example Embodiments

With reference to the Figures, further details are now provided concerning aspects of some example embodiments. First, with regard to AWS and Azure scripts, when a customer selects AWS or Azure as their cloud provider, the deploy button of the UI will generated a unique Cloud Formation script (AWS) or Resource Template (Azure) that the cloud provider is able to understand, and this script will allow the user to automatically deploy the data protection products specified by the user for the data protection configuration. This includes, in some example embodiments, Virtual Private Cloud, Public IP Addresses, Security Groups/Policies, DPD products and data disks, such as in the case of Avamar and DataDomain. When available, the AWS cloud formation or Azure resource template will reference existing marketing place offerings to deploy Dell EMC Data Protection Division (DPD) products.

In the case where a product, such as Dell EMC Networker for example, is not available in the AWS or Azure marketplace, the CLW system may provision a generic instance of Linux (Red Hat Enterprise Linux (RHEL)-based) and automatically download, install and configure NetWorker on the VM without any manual intervention by a user. This may be achieved using, for example, the ability of NetWorker to install itself via the Red Hat Package Manager (RPM) or Windows/Microsoft Installer (MSI) process. Cloud providers may offer the ability to run generic scripts during the deployment process, similar to VMware tools for example. Again, the entire process of provisioning infrastructure resources, which may be performed automatically as a result of the running of the script, for the data protection configured that has been defined is transparent to the user. The result is that a deployment and provisioning process that would otherwise be manual, and take an expert hours to deploy, is boiled down, in some embodiments, to three simple steps and performed in a matter of a few minutes.

With regard to on-prem and private cloud deployments, it is noted that the generated script can be that of a VMware vRealize library or a puppet/chef/ansible/salt stack plugin that customers can use in their existing automation framework. As well, the CLW system may enhanced to support running in any environment, whether it be on-prem, AWS, Azure, GCP (Google Cloud), or Alibaba Cloud, to name a few examples. In any case however, whether the data protection configuration is deployed on-prem or in the cloud, embodiments of the CLW system may greatly simplify the deployment process of multiple data protection products.

A useful aspect of some embodiments concerns user tracking. For example, upon every script download that is generated by CLW, a database on the backend, that is at the cloud datacenter, stores the data protection configuration that was generated by the user. This data includes name of products, versions and sizes. Additional data relating to the data protection configuration can be captured as well, such as GeoLocation of the user, IP Address, Browser, Email Address, Phone Number, and/or other information. All this information can be used for various purposes, including to generate sales leads for further engagement.

As will be apparent from this disclosure, example embodiments may provide a simple, integrated, and consistent user experience with regard to definition and deployment of a data protection configuration. This is true even where multiple different products are deployed together as a single deployment. Further, the data protection configurations may be customized to suit the particular cloud data protection environment in which they are to be deployed, whether on-prem/private cloud, or public cloud.

Further, provisioning needed to support the data protection configuration defined by the user may be performed automatically. For example, Avamar and DataDomain disks may be provisioned automatically. In this way, the user is spared the task of having to determine what hardware/software is needed to support the deployment, and is also spared the task of having to perform the provisioning of those assets.

E. Example Methods for Deployment of Data Protection Configuration

Figure 4:
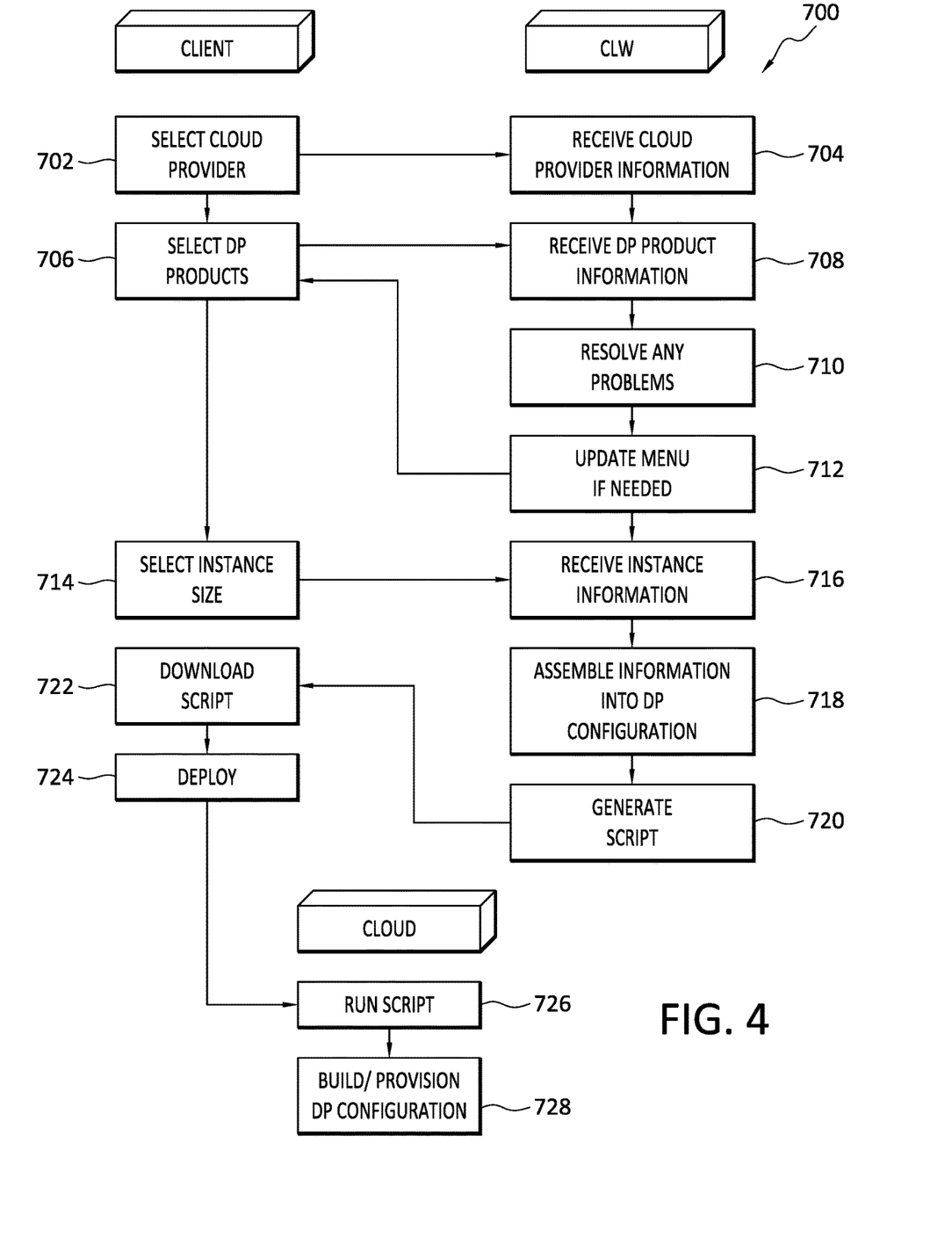
FIG. 4 is a flow diagram disclosing aspects of a method for implementing data protection in a cloud storage environment.

Turning now to FIG. 4, details are provided concerning methods for defining and deploying a data protection configuration, one example of which is denoted generally at 700. Part, or all, of the method 700 may be performed, such as by a CLW application hosted on a CLW server, for example, that may reside at a cloud datacenter or any other storage site. Alternatively, the CLW server may be operated by a service provider, and not located at a cloud datacenter. In at least some embodiments, the CLW server is located remotely from the user, or client, and from the cloud datacenter. As well, example embodiments of the method may be cooperatively performed by one or more of a user computing system, CLW server, and cloud datacenter.

It should be noted with respect to the respective example method of FIG. 4, that such method may be performed in the order indicated in that Figure, although that is not necessarily required. In other embodiments, the order of performance of one or more of the processes of any of the methods may be changed. Moreover, not all of the processes of the methods are necessarily required to be performed.

As indicated in FIG. 4, aspects of the example method 700 may be performed at a client, a CLW entity such as a server, and a cloud datacenter or other cloud data storage site. The indicated allocation of functions is provided only by way of example and in alternative embodiments, the functions may be allocated differently among the entities indicated and/or other entities.

With particular reference now to the example of FIG. 4, the method 700 may begin when a user at a client site accesses a CLW application, using a web browser for example. Initially the user may be presented with a user-selectable list of cloud providers, and the user may select 702 one of the displayed cloud providers. The selection signal generated as a result may be transmitted to, and received at 704, a service provider site, such as a CLW server. The cloud provider information received 704 may be stored at the service provider site.

Next, the user may be presented with a user-selectable list of data protection (DP) products, and the user may select 706 one or more of the displayed data protection products. As part of the selection 706 process, the user may also specify a particular respective version for one or more of the selected data protection products. The selection signal generated as a result may be transmitted to, and received at 708, a service provider site, such as a CLW server. The cloud provider information received 708 may be appended to the cloud provider information previously received 704, and stored at the service provider site.

The service provider site may perform a check 710, at any time, to determine if there are any problems or incompatibilities between or among the cloud provider selected at 702 and the data protection products selected at 704. In some embodiments, the check 710 may be omitted if potential conflicts have already been identified. Where potential conflicts or problems have already been identified, that information, which may reside at the service provider, may be accessed by the service provider and used to update 712 one or more menus, and choices, presented to a user.

After the cloud provider has been selected 702, and the data protection product(s) specified 704, a user at the client may then select an instance size 714 for the data protection configuration that is to be deployed. The selection signal generated as a result may be transmitted to, and received at 716, a service provider site, such as a CLW server. The instance size information received 716 may be appended to the cloud provider information previously received 704 and the data protection product(s) information previously received 708, and stored at the service provider site.

With the information received 704/708/716 from the client, the CLW site may then assemble that information, or otherwise use that information, into a data protection configuration 718. The data protection configuration, and the associated information, may then be used as a basis for generation of a script 720 which, when executed, effects deployment and provisioning, at the cloud storage site, of the data protection configuration defined by the user. The script, or a link to the script, may be presented to a user at the client, such as by way of a UI, enabling the user to download 722 the script. In some embodiments, the user may save the script at the client site and/or elsewhere. As well, the user may modify the script prior to deployment.

In any case, the user may then deploy 724 the data protection configuration to the cloud storage. This process may involve, for example, accessing of a cloud storage console, such as by way of a browser or other UI at the client site, and requesting that the script be run. In response, the cloud storage site then runs 726 the script. Execution of the script causes the automatic deployment and provisioning 728 of the data protection configure defined by the user.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment. Where one or more aspects of an embodiment involve the use of a web browser, such aspects may be implemented by way of any device that includes such a web browser. Examples of such devices include, but are not limited to, desktop computers, laptops, personal digital assistants, tablets, and smartphones.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   presenting, to a user at a client site, a list of user-selectable cloud storage providers;
   receiving, from the user, an input that indicates selection by the user of one of the cloud storage providers from the list of user-selectable cloud storage providers;
   after the user has selected a cloud storage provider, presenting, to the user, a list of user-selectable data protection products;
   receiving, from the user, one or more product selection inputs, each of the one or more product selection inputs indicating selection, by the user, of a respective data protection product from the list of user-selectable data protection products;
   receiving, from the user, an input indicating an instance size;
   assembling the input indicating an instance size and the product selection inputs together to define a data protection configuration; and
   automatically generating a script which is executable by one or more hardware processors to deploy the data protection configuration in a cloud storage environment of the selected cloud storage provider.

2. The method as recited in claim 1, wherein the selected cloud storage provider is either a public cloud storage provider, or a private cloud storage provider.

3. The method as recited in claim 1, wherein the input indicating an instance size and the product selection inputs are received from the user by way of a client web browser.

4. The method as recited in claim 1, wherein the automatically generated script is executable at the selected cloud storage provider.

5. The method as recited in claim 1, further comprising transmitting a link that enables downloading of the automatically generated script.

6. The method as recited in claim 1, further comprising preventing selection, by the user, of a data protection product that is incompatible with the respective data protection products associated with the one or more product selection inputs.

7. The method as recited in claim 1, wherein at least part of the method is performed at a service provider site that is separate from the client site from which the input indicating an instance size and the product selection inputs are received, and is also separate from the selected cloud storage provider.

8. The method as recited in claim 1, wherein the defined data protection configuration, when deployed in the cloud storage environment of the selected cloud storage provider, is operable to perform any one or more of the following: data backup; data deduplication; and, data restore.

9. The method as recited in claim 1, wherein the automatically generated script, when executed, provides for automatic provisioning of the defined data protection configuration.

10. The method as recited in claim 9, wherein provisioning comprises automatically associating a disk with the defined data protection configuration.

11. A non-transitory storage medium having stored therein instructions which are executable by one or more hardware processors to perform operations comprising:
   presenting, to a user at a client site, a list of user-selectable cloud storage providers;
   receiving, from the user, an input that indicates selection by the user of one of the cloud storage providers from the list of user-selectable cloud storage providers;
   after the user has selected a cloud storage provider, presenting, to the user, a list of user-selectable data protection products;
   receiving, from the user, one or more product selection inputs, each of the one or more product selection inputs indicating selection, by the user, of a respective data protection product from the list of user-selectable data protection products;
   receiving, from the user, an input indicating an instance size;
   assembling the input indicating an instance size and the product selection inputs together to define a data protection configuration; and
   automatically generating a script which is executable by one or more hardware processors to deploy the data protection configuration in a cloud storage environment of the selected cloud storage provider.

12. The non-transitory storage medium as recited in claim 11, wherein the selected cloud storage provider is either a public cloud storage provider, or a private cloud storage provider.

13. The non-transitory storage medium as recited in claim 11, wherein the input indicating an instance size and the product selection inputs are received from the user by way of a client web browser.

14. The non-transitory storage medium as recited in claim 11, wherein the automatically generated script is executable at the selected cloud storage provider.

15. The non-transitory storage medium as recited in claim 11, wherein the operations further comprise transmitting a link that enables downloading of the automatically generated script.

16. The non-transitory storage medium as recited in claim 11, wherein the operations further comprise preventing selection, by the user, of a data protection product that is incompatible with the respective data protection products associated with the one or more product selection inputs.

17. The non-transitory storage medium as recited in claim 11, wherein one or more of the operations are performed at a service provider site that is separate from the client site from which the input indicating an instance size and the product selection inputs are received, and is also separate from the selected cloud storage provider.

18. The non-transitory storage medium as recited in claim 11, wherein the defined data protection configuration, when deployed in the cloud storage environment of the selected cloud storage provider, is operable to perform any one or more of the following: data backup; data deduplication; and, data restore.

19. The non-transitory storage medium as recited in claim 11, wherein the automatically generated script, when executed, provides for automatic provisioning of the defined data protection configuration, and provisioning includes associating a disk with the defined data protection configuration.

20. A physical computing system, comprising:
   one or more hardware processors; and
   the non-transitory storage medium as recited in claim 11.

* * * * *